(12) United States Patent
Gambetta et al.

(10) Patent No.: US 11,537,381 B2
(45) Date of Patent: Dec. 27, 2022

(54) QUANTUM SOFTWARE DEVELOPER KIT AND FRAMEWORK

(71) Applicant: International Business Machines Corporation, Armonk, NY (US)

(72) Inventors: Jay M. Gambetta, Yorktown Heights, NY (US); Ismael Faro Sertage, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/511,366

(22) Filed: Jul. 15, 2019

(65) Prior Publication Data
US 2021/0019132 A1 Jan. 21, 2021

(51) Int. Cl.
*G06F 8/65* (2018.01)
*G06N 10/00* (2022.01)

(52) U.S. Cl.
CPC ............... *G06F 8/65* (2013.01); *G06N 10/00* (2019.01)

(58) Field of Classification Search
CPC .................................. G06F 8/65; G06N 10/00
See application file for complete search history.

(56) References Cited

U.S. PATENT DOCUMENTS

| | | | |
|---|---|---|---|
| 8,230,415 B1 * | 7/2012 | Thomas | G06F 8/65 |
| | | | 717/176 |
| 9,753,719 B2 * | 9/2017 | Hilliar | H04W 12/03 |
| 9,870,273 B2 | 1/2018 | Dadashikelayeh et al. | |
| 10,536,224 B1 * | 1/2020 | Nation | G06N 10/00 |
| 10,826,845 B2 * | 11/2020 | Dadashikelayeh | G06N 5/003 |
| 2003/0169041 A1 | 9/2003 | Coury et al. | |
| 2007/0294070 A1 | 12/2007 | Yamashita | |
| 2008/0022272 A1 * | 1/2008 | Komano | G06F 8/65 |
| | | | 717/170 |
| 2009/0319848 A1 * | 12/2009 | Thaper | G06F 8/64 |
| | | | 717/173 |
| 2012/0084836 A1 * | 4/2012 | Mahaffey | G06F 21/31 |
| | | | 726/3 |

(Continued)

FOREIGN PATENT DOCUMENTS

| WO | WO 2020/047426 A1 * | 3/2020 | ............. G06N 10/00 |
|---|---|---|---|
| WO | WO-2020047426 A1 * | 3/2020 | ............. G06N 10/00 |

OTHER PUBLICATIONS

McCaskey et al., "Hybrid Programming for Near-term Quantum Computing Systems", 2018, IEEE (Year: 2018).*

(Continued)

*Primary Examiner* — Qing Chen
*Assistant Examiner* — Junchun Wu
(74) *Attorney, Agent, or Firm* — Amin, Turocy & Watson, LLP

(57) ABSTRACT

Techniques facilitating quantum software developer kit and framework as a service are provided. A system can comprise a memory that stores computer executable components and a processor that executes the computer executable components stored in the memory. The computer executable components can comprise an execution component that executes, on a quantum device located within a cloud computing environment, a code based on an identification of (Continued)

the code received from a communication device. A quantum software development kit can execute on the communication device.

20 Claims, 10 Drawing Sheets

(56) References Cited

U.S. PATENT DOCUMENTS

| | | | | |
|---|---|---|---|---|
| 2012/0254859 | A1* | 10/2012 | DiCarlo | G06F 8/65 |
| | | | | 717/178 |
| 2014/0195394 | A1* | 7/2014 | Schoenen | H04L 12/1435 |
| | | | | 705/34 |
| 2016/0087956 | A1* | 3/2016 | Maheshwari | G06F 8/61 |
| | | | | 726/6 |
| 2017/0223143 | A1* | 8/2017 | Johnson | G06F 9/541 |
| 2017/0357539 | A1* | 12/2017 | Dadashikelayeh | H04L 63/20 |
| 2018/0107526 | A1 | 4/2018 | Dadashikelayeh et al. | |
| 2018/0197102 | A1 | 7/2018 | Mohseni et al. | |
| 2018/0246851 | A1* | 8/2018 | Zaribafiyan | G06F 17/18 |
| 2018/0375790 | A1* | 12/2018 | Dadashikelayeh | G06F 21/44 |
| 2019/0163910 | A1* | 5/2019 | Moon | H04L 9/088 |
| 2019/0279447 | A1* | 9/2019 | Ricci | G06Q 20/145 |
| 2020/0097859 | A1* | 3/2020 | Hu | G06N 10/00 |
| 2020/0104739 | A1* | 4/2020 | Sharma | G06F 16/904 |
| 2020/0119987 | A1* | 4/2020 | Griffin | H04L 41/12 |
| 2020/0183814 | A1* | 6/2020 | Liu | G06F 11/3664 |
| 2021/0019132 | A1* | 1/2021 | Gambetta | G06F 8/65 |

OTHER PUBLICATIONS

Fingerhuth et al., "Open source software in quantum computing", 2018, arXiv (Year: 2018).*
Li et al. "Quantum Computer Simulation on GPU Cluster Incorporating Data Locality", 2017, Springer (Year: 2017).*
Björnson, "TBTK: A quantum mechanics software development kit", Aug. 2018, Elsevier B.V. (Year: 2018).*
Baumgartner t al., "VSP—a quantum-electronic simulation framework", Nov. 28, 2013, Springer Science+Business Media New York (Year: 2013).*
Bettell et al. "Toward an architecture for quantum programming," The European Physical Journal D—Atomic, Molecular, Optical and Plasma Physics 25, No. 2: 181-200. (2003).
Pauca et al. "Automating the development of quantum computational software," Proceedings of the 45th annual southeast regional conference (ACM-SE 45). ACM, New York, NY, USA, 541-543. (2007).
Groth et al. "Kwant: a software package for quantum transport," New Journal of Physics 16, No. 6: 063065. (2014).
Barabasi et al. "Student User Experience with the IBM QISKit Quantum Computing Interface." Retrieved from Internet using: http://csis.pace.edu/~aleider/it691-18fall/quantum.pdf (2019).
Mell et al., "The NIST Definition of Cloud Computing," Recommendations of the National Institute of Standards and Technology, NIST Special Publication 800-145, Sep. 2011, 7 pages.

* cited by examiner

QUANTUM SOFTWARE DEVELOPER KIT AND FRAMEWORK

BACKGROUND

The subject disclosure relates to quantum computing and, more specifically, to facilitating quantum computing as a service.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses, and/or computer program products that facilitate a quantum software developer kit and framework are provided.

According to an embodiment, a system can comprise a memory that stores computer executable components and a processor that executes the computer executable components stored in the memory. The computer executable components can comprise an execution component that executes, on a quantum device located within a cloud computing environment, a code based on an identification of the code received from a communication device. The quantum software development kit can execute on the communication device.

According to another embodiment, a computer-implemented method can comprise executing, by a system operatively coupled to a processor, a code at a quantum device. An identification of the code can be received from a communication device. Further, a quantum software development kit can execute on the communication device. In addition, the quantum device can be located in a cloud computing environment.

According to a further embodiment, a computer program product that facilitates usage of a quantum software developer kit and framework is provided. The computer program product can comprise a computer readable storage medium having program instructions embodied therewith, the program instructions can be executable by a processing component to cause the processing component to execute, on a quantum device located in a cloud computing environment, a code based on an identification of the code received from a communication device. A quantum software development kit can execute on the communication device.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
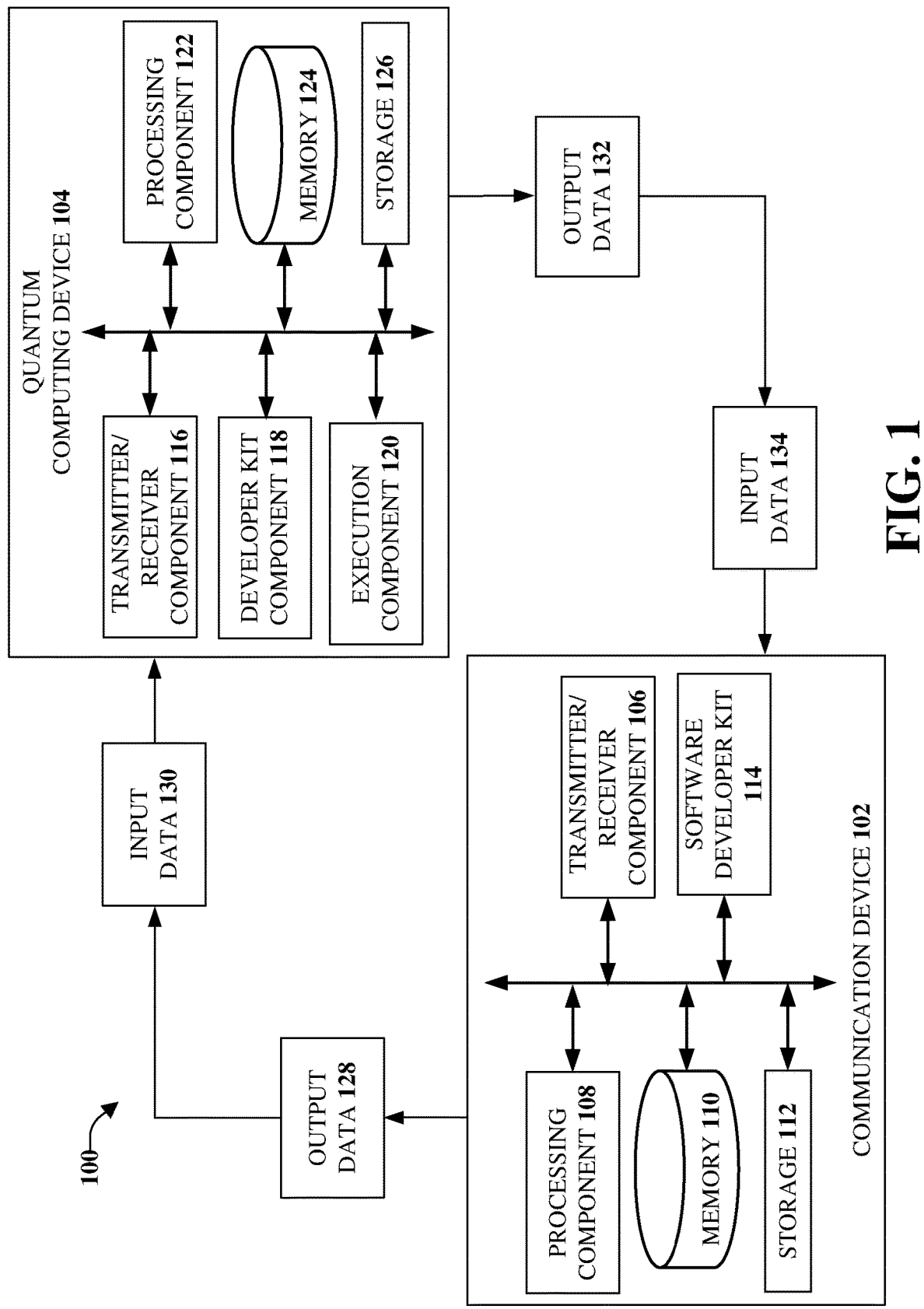
FIG. 1 illustrates a block diagram of an example, non-limiting, system that facilitates quantum software developer kit and framework in accordance with one or more embodiments described herein.

FIG. 1 illustrates a block diagram of an example, non-limiting, system 100 that facilitates quantum software developer kit and framework in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

In the embodiment shown in FIG. 1, the system 100 can comprise a communication device 102 that can be operatively coupled to a quantum computing device 104. The operatively coupling can be via a wireless communication link, according to some implementations. The quantum computing device 104 can be located within a cloud computing environment and can be included in a group of quantum computing devices within the cloud computing environment.

The communication device 102 can comprise a transmitter/receiver component 106, a processing component 108, a memory 110, and/or a storage 112. The memory 110 can store computer executable components and instructions. The processing component 108 (e.g., a processor) can facilitate execution of the instructions (e.g., computer executable components and corresponding instructions) by the transmitter/receiver component 106 and/or other system components. As shown, in some embodiments, one or more of the transmitter/receiver component 106, the processing component 108, the memory 110, and/or the storage 112 can be electrically, communicatively, and/or operatively coupled to one another to perform one or more functions of the communication device 102.

Further, a software developer kit 114 can be executing on the communication device 102. The software developer kit 114 can be, or can include, a set of tools that can be utilized for facilitating implementation of one or more quantum processes that can be executed by the quantum computing device 104 within the quantum computing environment. For example, the software developer kit can comprise one or more application program interfaces (APIs). For example, the APIs can be formatted as on-device libraries that can interface to one or more programming languages. According to some implementations, the software developer kit 114 can comprise code, sample code, technical notes, supporting documentation (e.g., tutorials for a user of the communication device), and/or other information.

The quantum computing device 104 can comprise a transmitter/receiver component 116, a developer kit component 118, an execution component 120, a processing component 122, a memory 124, and/or a storage 126. The memory 124 can store computer executable components and instructions. The processing component 122 (e.g., a processor) can facilitate execution of the instructions (e.g., computer executable components and corresponding instructions) by the transmitter/receiver component 116, the developer kit component 118, the execution component 120, and/or other system components. As shown, in some embodiments, one or more of the transmitter/receiver component 116, the developer kit component 118, the execution component 120, the processing component 122, the memory 124, and/or the storage 126 can be electrically, communicatively, and/or operatively coupled to one another to perform one or more functions of the quantum computing device 104.

To facilitate quantum processing on various data, according to the various aspects provided herein, the software developer kit 114 can be installed on (or provided with) the communication device 102 and can interface with the developer kit component 118. For example, the software developer kit 114 can be downloaded or otherwise installed on the communication device. Further, the developer kit component 118 can be utilized with more than one communication device.

At the communication device 102, one or more input values (or initial values) can be entered (e.g., entered manually by a user, automatically inferred by the software developer kit 114, and so on). For example, the one or more input values can be entered into a spreadsheet program or another program.

Further, a code that should be executed at the quantum computing device 104 can be selected at the communication device 102. For example, the code can be selected from a group of quantum codes (or quantum algorithms) including, but not limited to, Variational Quantum Eigen Solvers (VQE) algorithms, Quantum Approximate Optimization Algorithms (QAOA), Variational Quantum Classifier (VQC), Quantum version of Generative Adversarial Networks (QGANs), Quantized Support Vector Machines (QSVMs), quantum classifiers, Quantum Neural Networks (QNN), and so on.

The input values can be sent, by the transmitter/receiver component 106 as output data 128. The output data 128 can also comprise a selection of a function to be executed by the quantum computing device 104 (e.g., an indication of a code that should be executed by the quantum computing device 104). For example, upon or after entry of the input values, a function can be selected from a list of functions (e.g., through selection of a drop-down menu or through another manner of selection). According to some implementations, the output data 128 can comprise an identification of the communication device 102 and/or an identification of a user of the communication device 102. Further, in some implementations, the output data 128 can comprise authentication information associated with the user and/or the communication device 102.

The output data 128 from the communication device 102 can be received at the quantum computing device 104 as input data 130. Upon or after receipt of the input data 130 (e.g., via the transmitter/receiver component 116), the execution component 120 can facilitate execution of one or more quantum computing functions based, at least in part, on the input data 130. According to some implementations, prior to the execution of the one or more quantum computing functions, the user and/or the communication device 102 can be authenticated with the developer kit component 118.

Upon or after completion of the one or more quantum computing functions, the transmitter/receiver component 116 can output a result, as output data 132. The output data 132 can be received at the communication device 102 (e.g., via the transmitter/receiver component 106) as input data 134. The input data 134 (e.g., computation results) can be rendered on the communication device in various formats (e.g., a visual rendering of data, a visual rending of a graph or chart detailing the results, other visual outputs, audible outputs, and so on). In some implementations, an indication or prompt can be rendered at the communication device that notifies the user that the results are ready. Based on the prompt, the results can be selectively provided to the user in various formats.

The amount of time that occurs between the sending of the output data 128 and the receipt of the input data 134 at the communication device 102 can be nearly instantaneous, depending on the speed of the link between the communication device 102 and the quantum computing device 104 as well as other limitations experienced by wireless communications and computing devices.

As discussed herein, complex quantum computing code and/or functionality does not need to be stored at the communication device 102 (e.g., by the storage 112). Accordingly, the one or more quantum computing functions can be offloaded from the communication device 102 to the quantum computing device 104. Thus, processing efficiencies can be realized through utilization of the disclosed aspects. Processing efficiencies include, but are not limited to, an increased processing speed associated with execution of the one or more computing functions. Based on the various aspects provided herein, the communication device 102 can be a device that has limited processing capabilities but through which quantum computing functionalities can be realized, according to some implementations. Further, since the quantum computing functions are accessible via the quantum cloud computing environment, a variety of devices, located anywhere in the world, can utilize the disclosed aspects.

In various embodiments, the system 100 can be a quantum computing system associated with technologies such as, but not limited to, quantum circuit technologies, quantum processor technologies, quantum computing technologies, artificial intelligence technologies, medicine and materials technologies, chemical technologies, financial services technologies, and/or other digital technologies. The system 100 can employ hardware and/or software to solve problems that are highly technical in nature, that are not abstract and that cannot be performed as a set of mental acts by a human. Further, in certain embodiments, some of the processes performed can be performed by one or more specialized computers (e.g., one or more specialized processing units, a specialized computer with a quantum computing component, etc.) to carry out defined tasks related to quantum computing provides as a software developer kit on a user equipment device.

The system 100 and/or components of the system 100 can be employed to solve new problems that arise through advancements in technologies mentioned above, computer architecture, and/or the like. One or more embodiments of the system 100 can provide technical improvements to quantum computing systems, quantum circuit systems, quantum processor systems, artificial intelligence systems, and/or other systems. One or more embodiments of the system 100 can also provide technical improvements to a quantum processor (e.g., a superconducting quantum processor) by improving processing performance of the quantum processor, improving processing efficiency of the quantum processor, improving processing characteristics of the quantum processor, improving timing characteristics of the quantum processor, and/or improving power efficiency of the quantum processor.

It is to be appreciated that the system 100 performs quantum computing processing that cannot be performed by a human (e.g., is greater than the capability of a single human mind). For example, an amount of data processed, a speed of data processed, and/or data types of data processed by the system 100 over a certain period of time can be greater, faster, and different than an amount, speed, and data type that can be processed by a single human mind over the same period of time. The system 100 can also be fully operational towards performing one or more other functions (e.g., fully powered on, fully executed, etc.) while also performing the above-referenced quantum computing processes. Moreover, computed data (e.g., the output data 132, the input data 134) generated and coordinated by the quantum computing device 104 can include information that is impossible to obtain manually by a user. For example, a type of information included in the computed data, a variety of information associated with the computed data, and/or optimization of the computed data can be more complex than information that can be obtained manually and processed by a user.

Figure 2:
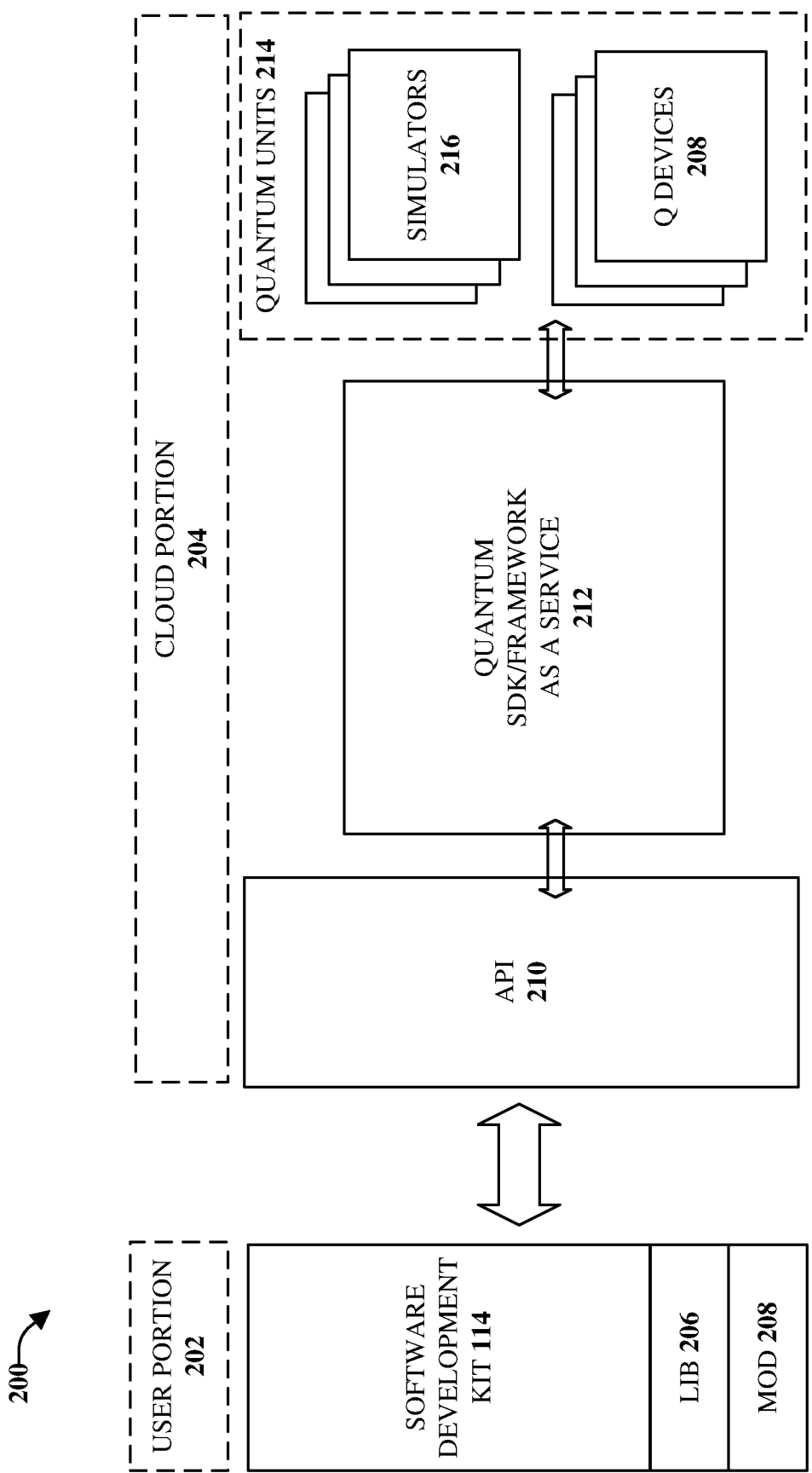
FIG. 2 illustrates a block diagram of an example, non-limiting, system that facilitates quantum processing remote from a user equipment device in accordance with one or more embodiments described herein.

FIG. 2 illustrates a block diagram of an example, non-limiting, system 200 that facilitates quantum processing remote from a user equipment device in accordance with one or more embodiments described herein. Repetitive description of like elements employed in other embodiments described herein is omitted for sake of brevity.

The system 200 can comprise one or more of the components and/or functionality of the system 100, and vice versa. As illustrated in FIG. 2, the system 200 can be divided into a user portion 202 and a cloud computing portion 204. The user portion 202 can include the communication device 102, which can comprise the software developer kit 114, one or more libraries 206, and one or more modules 208. The cloud computing portion 204 can comprise one or more APIs 210, a quantum service development kit/framework as a service 212 (e.g., the developer kit component 118), and one or more quantum units 214. The one or more quantum units 214 can comprise one or more quantum simulators 216 and one or more quantum devices 218 (e.g., including the quantum computing device 104).

Quantum programming is the process of assembling sequences of instructions, referred to as quantum programs, that are capable of running (e.g., executing) on a quantum computer. Quantum programming languages help express quantum algorithms using high-level constructs. The various aspects discussed herein can be utilized to provide a personalized solution to the user (e.g., via the communication device 102) and/or a service to use the software developer kit 114 and associated frame work online.

Depending on the user profile, the user (e.g., via the communication device 102) can have access to different options and/or configurations. The basic functionality can be to provide the software development kit services and the software development kit dependencies online, removing the process of the specific compilation and allowing the user (e.g., the communication device 102) to create and/or execute several versions from the same circuit code. Additionally, or alternatively, and depending on the user configuration, the user can receive the results (e.g., via the transmitter/receiver component 106) and one specific version (or multiple versions) of the circuits to execute in local back-ends.

The disclosed aspects can save time by delegating at least a portion of the software developer kit/framework use in the cloud (e.g., use the optimized algorithms, libraries, compiler pass, and so on). In addition, the various aspects can provide at least a portion of online, personalized software developer kit and/or software developer framework elements to the user (e.g., the user device). The user device can link the, personalized software developer kit and/or software developer framework elements with the local software developer kit/framework (e.g., the software developer kit 114) in a transparent mode.

According to some implementations, the user, via the communication device 102, can begin to define some program and/or algorithm offline or online, and call the specific tools online (e.g., in the quantum cloud computing environment) to improve the speed and obtain specific characteristics that are not possible to have in local tools (e.g., due to the limited capabilities of the communication device 102).

According to an implementation, provided is a software developer kit and framework as a service. Based on a user profile, a client device can be granted access to a set of options and configurations. Further, a software developer kit can be provided to the client device. A code can be received from the client device. The code can utilize a portion of the software developer kit. In addition, the code can be optimized based on a repository of optimizations. Further, the code can be optimized based on profiles of available quantum devices. A quantum device of a group of quantum devices can be identified based on the optimized code. The optimized code can be executed on the identified device and the results can be provided to the client device.

Embodiments discussed herein can also be delivered as part of a service engagement with a client corporation, nonprofit organization, government entity, internal organizational structure, or the like. Aspects of these embodiments can include configuring a computer system to perform, and deploy software, hardware, and web services that implement, some or all of the aspects described herein. Aspects of these embodiments can also include analyzing the client's operations, creating recommendations responsive to the analysis, building systems that implement portions of the recommendations, integrating the systems into existing processes and infrastructure, metering usage of the systems, allocating expenses to users of the systems, and billing (e.g., invoicing) for use of the systems. Although the above embodiments have been described by stating their individual advantages, respectively, the disclosed aspects are not limited to a particular combination thereof. To the contrary, such embodiments can also be combined in any way and number according to the intended deployment without losing their beneficial effects.

As mentioned, according to some implementations, usage of a computing function of the quantum device or the available quantum devices can be metered. For example, upon or after receipt of a code at the quantum device(s) information related to the usage of the quantum device(s) to execute the code can be tracked. Based on the metered usage, or tracking of the use, an invoice can be generated. The invoice can output at the communication device 102 or rendered in another format.

Figure 3:
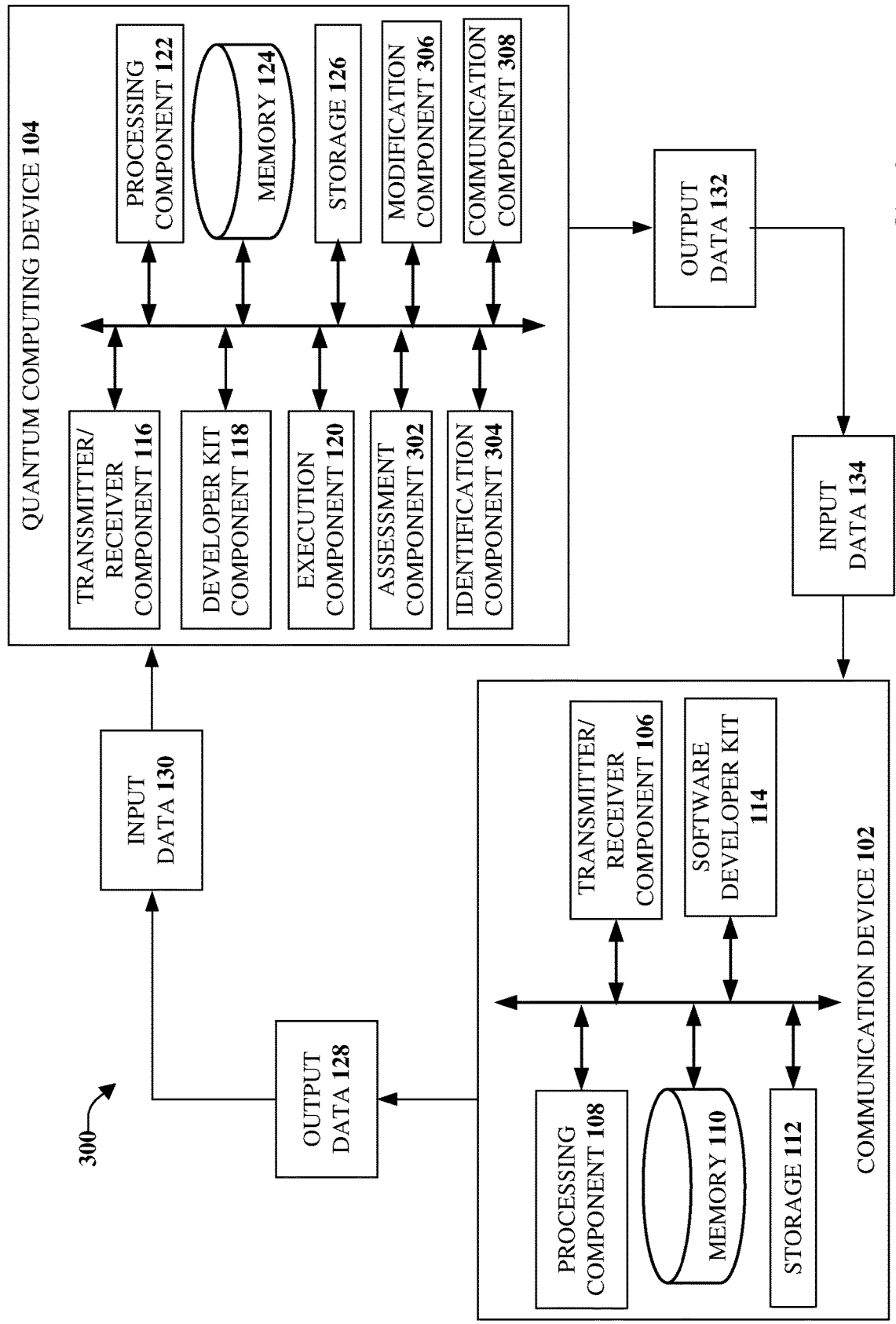
FIG. 3 illustrates a block diagram of an example, non-limiting, system that facilitates usage of an online quantum software development kit and/or framework in accordance with one or more embodiments described herein.

FIG. 3 illustrates a block diagram of an example, non-limiting, system 300 that facilitates usage of an online quantum software development kit and/or framework in accordance with one or more embodiments described herein. Repetitive description of like elements employed in other embodiments described herein is omitted for sake of brevity.

The system 300 can comprise one or more of the components and/or functionality of the system 100, the system 200, and vice versa. As illustrated in FIG. 3, the system 300 can include an assessment component 302, an identification component 304, a modification component 306, and a communication component 308.

The assessment component 302 can grant the communication device 102 access to a set of options and/or a set of configurations associated with the quantum processing. The access can be granted by the assessment component 302 based on a profile associated with the communication device 102. For example, the profile can be associated with a user of the communication device 102. According to some implementations, the profile can include one or more preferences selected by a user of the communication device 102 and/or automatically inferred based on historical interactions between the user and the communication device 102, between the communication device 102 and the quantum computing device 104, and so on. In an example, the set of options and/or the set of configurations can be selectable, at the communication device 102, during a request for execution of the quantum computing processes at the quantum computing device 104 (e.g., via a drop down menu or another manner of selection).

The identification component 304 can select the quantum computing device 104 from a group of quantum devices. For example, the identification component 304 can select the quantum computing device 104 as a function of the code (or the input data 130) received from the communication device 102. The selection of the quantum computing device 104 (as well as the quantum processing by the quantum computing device 104) can be hidden from the communication device 102. For example, the communication device 102 does not need to be aware of the identification of the quantum computing device 104 and/or the quantum functions being performed by the quantum computing device 104 (or more than one quantum computing device).

According to some implementations, the algorithm/quantum code can be updated at the quantum computing device 104, by the modification component 306. For example, the modification component 306 can update the code at the quantum computing device 104 based on the input data 130 received. In an example, the algorithm/quantum code can be optimized and adapted in order to improve (or increase) the execution speed and the usage of the quantum computing device 104.

The communication component 308 can facilitate rendering of a result of an execution of the code by the quantum computing device 104 (e.g., the output data 132) at the communication device 102. For example, an indication can be rendered on a display of the communication device 102 notifying the user that the results (e.g., the input data 134) is ready. The quantum results and/or algorithm/code obtained from the service (e.g., the quantum computing device 104) can be analyzed and/or can be used in generic simulators.

According to some implementations, the execution component 120 can facilitate usage of quantum characteristics for execution of the code at the quantum computing device 104. The quantum characteristics are not accessible by the communication device 102. For example, quantum code and/or algorithms do not need to be stored and/or performed by the communication device 102.

As discussed herein, the user (via the communication device 102) can begin to define a program and/or algorithm either online or offline. Further, the user (via the communication device 102) can call the specific tools online to improve the speed and to obtain specific characteristics that might not be possible to have in local tools (e.g., on the communication device 102).

Figure 4:
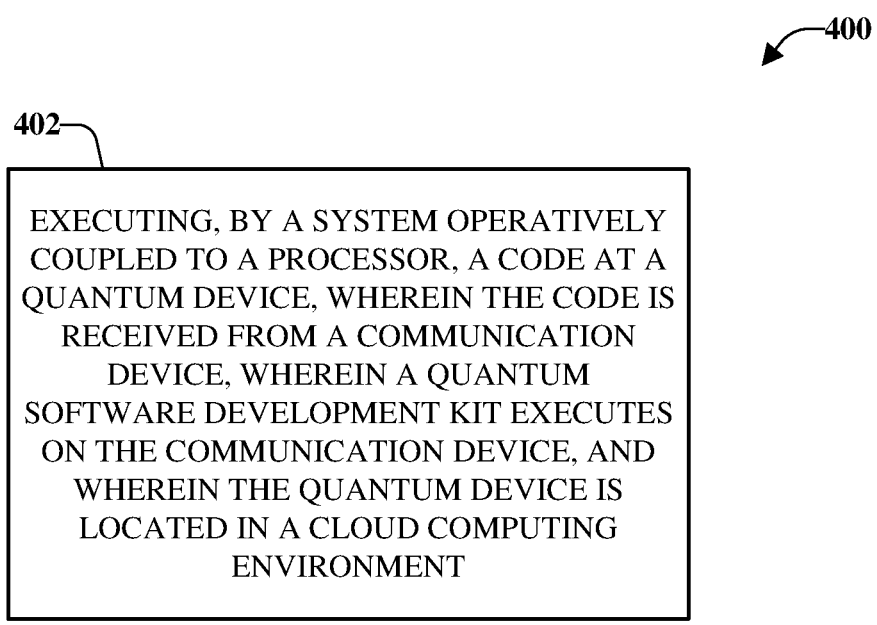
FIG. 4 illustrates a flow diagram of an example, non-limiting, computer-implemented method that facilitates quantum software developer kit and framework as a service in accordance with one or more embodiments described herein.

FIG. 4 illustrates a flow diagram of an example, non-limiting, computer-implemented method 400 that facilitates quantum software developer kit and framework as a service in accordance with one or more embodiments described herein. Repetitive description of like elements employed in other embodiments described herein is omitted for sake of brevity.

At 402 of the computer-implemented method 400, a system operatively coupled to a processor can execute a code at a quantum device (e.g., via the execution component 120). The code can be received from a communication device (e.g., the communication device 102). Further, a quantum software development kit (e.g., the software developer kit 114) can execute on the communication device.

According to some implementations, the quantum device can be located in a cloud computing environment. Therefore, the quantum device can be selected from a group of quantum devices. In some implementations, more than one quantum computing device can be utilized to execute the code.

Figure 5:
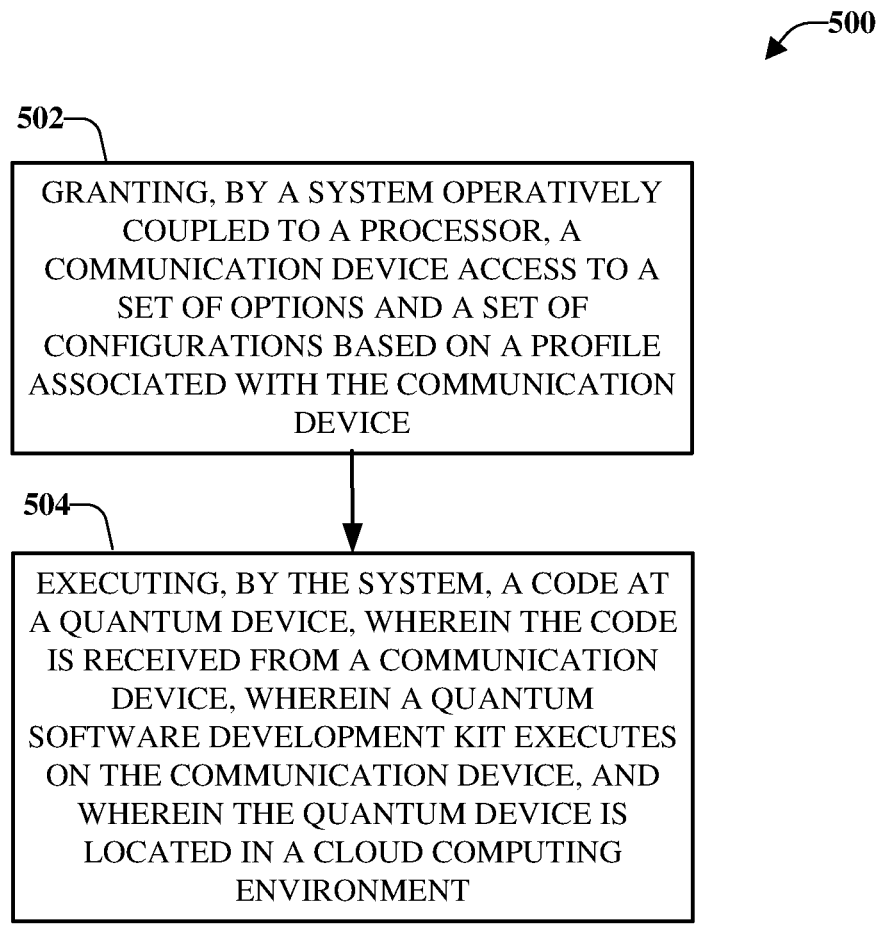
FIG. 5 illustrates a flow diagram of an example, non-limiting, computer-implemented method that facilitates a quantum software developer kit and framework as a service based on a user profile in accordance with one or more embodiments described herein.

FIG. 5 illustrates a flow diagram of an example, non-limiting, computer-implemented method 500 that facilitates a quantum software developer kit and framework as a service based on a user profile in accordance with one or more embodiments described herein. Repetitive description of like elements employed in other embodiments described herein is omitted for sake of brevity.

At 502 of the computer-implemented method 500, a system operatively coupled to a processor can grant a communication device access to a set of options and/or a set of configurations based on a profile associated with the communication device (e.g., via the assessment component 302). For example, the profile can be associated with a user of the communication device. According to some implementations, the user and/or the communication device can be authenticated prior to granting access to the set of options and/or the set of configurations.

Further, at 504 of the computer-implemented method 500, the system can execute a code at a quantum device (e.g., via the execution component 120). In an example, the code can be a quantum code. The code (as well as other data) can be received from a communication device on which a quantum software development kit is executing.

Figure 6:
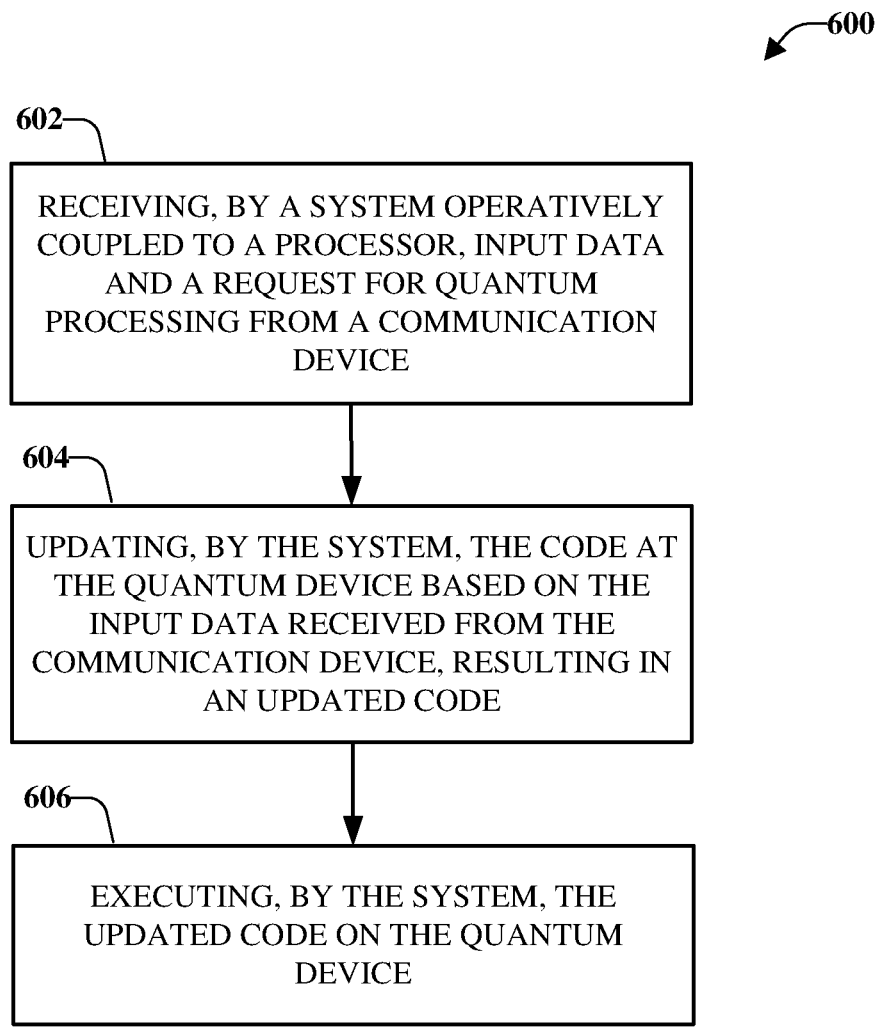
FIG. 6 illustrates a flow diagram of an example, non-limiting, computer-implemented method that facilitates updating a quantum code based on received input and executing the updated quantum code in a cloud computing environment in accordance with one or more embodiments described herein.

FIG. 6 illustrates a flow diagram of an example, non-limiting, computer-implemented method 600 that facilitates updating a quantum code based on received input and executing the updated quantum code in a cloud computing environment in accordance with one or more embodiments described herein. Repetitive description of like elements employed in other embodiments described herein is omitted for sake of brevity.

At 602 of the computer-implemented method 600, a system operatively coupled to a processor can receive input data and a request for quantum processing from a communication device (e.g., via the transmitter/receiver component 116). The input data can comprise, for example, initial values on which the quantum processing should be performed. The input data can also comprise other information such as, but not limited to, identification of a user and/or a communication device, authentication information associated with the user and/or the communication device, and so on.

Further, at 604, the code can be updated at the quantum device based on the input data received from the communication device (e.g., via the modification component 306). Updating the code can result in an updated code. At 606 of the computer-implemented method 600, the system can execute the updated code on the quantum device.

Figure 7:
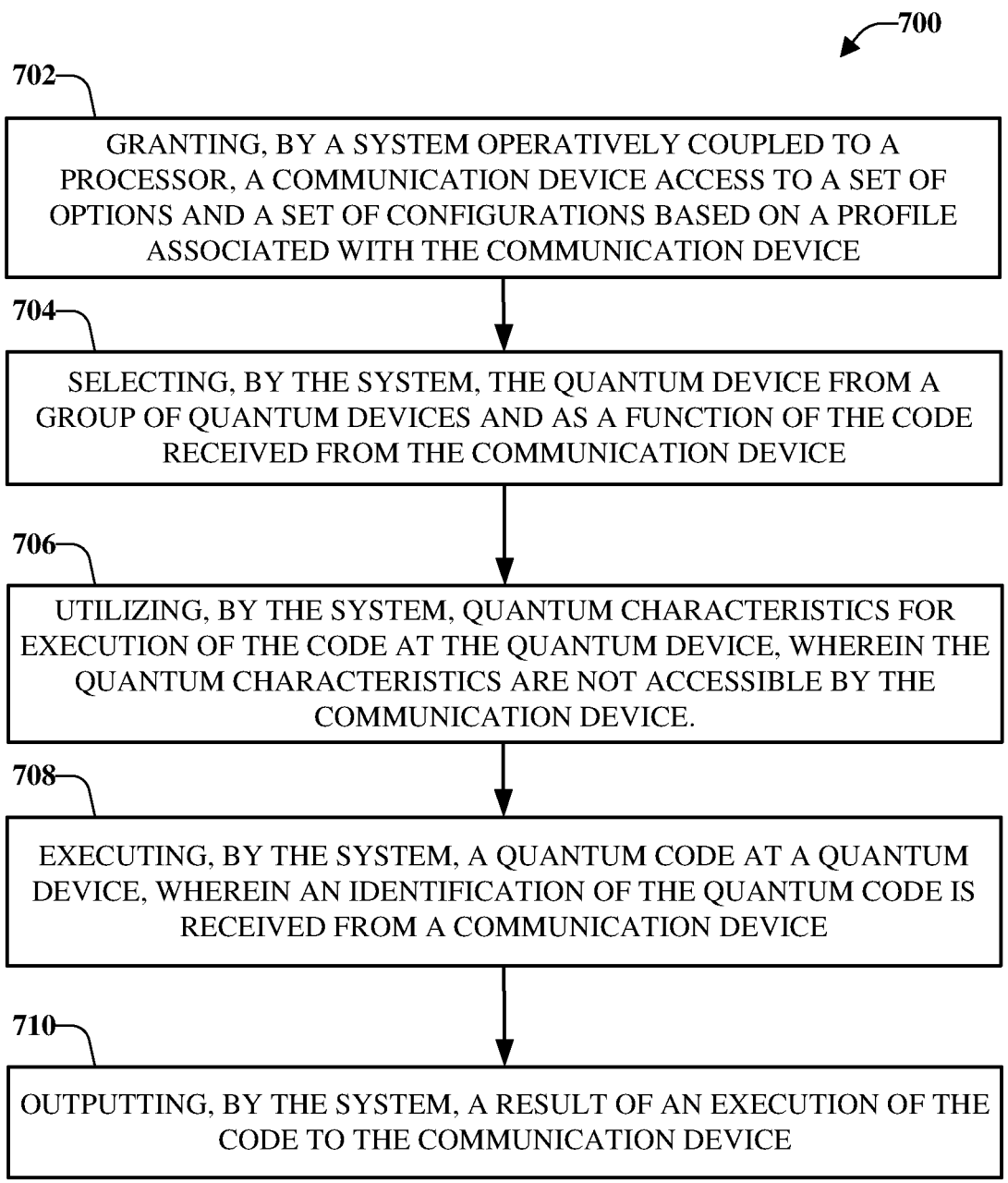
FIG. 7 illustrates a flow diagram of an example, non-limiting, computer-implemented method that facilitates delegation of quantum processing in accordance with one or more embodiments described herein.

FIG. 7 illustrates a flow diagram of an example, non-limiting, computer-implemented method 700 that facilitates delegation of quantum processing in accordance with one or more embodiments described herein. Repetitive description of like elements employed in other embodiments described herein is omitted for sake of brevity.

At 702 of the computer-implemented method 700, a system operatively coupled to a processor can grant a communication device access to a set of options and a set of configurations based on a profile associated with the communication device (e.g., via the execution component 120). The set of options and/or the set of configurations can be selected at the communication device, depending on the quantum process desired to be performed online in a quantum cloud computing environment.

A quantum device can be selected from a group of quantum devices by the system, at 704 (e.g., via the identification component 304). According to some implementations, the quantum device can be selected as a function of the identification of the code received from the communication device. Further, at 706 of the computer-implemented method 700, the system can utilize quantum characteristics for execution of the code at the quantum device (e.g., via the execution component 120). The quantum characteristics are not accessible by the communication device (e.g., the quantum processing is offloaded or delegated to the quantum devices in the quantum cloud computing environment). Accordingly, there is no quantum code and/or functions performed at the communication device. Further, there is no need for a user of the communication device to understand or be aware of the quantum processing being performed.

At 708 of the computer-implemented method 700, the system can execute a quantum code at a quantum device (e.g., via the execution component 120). An identification of the quantum code can be received from a communication device. According to some implementations, executing the code at the quantum device can comprise increasing, by the system, a processing speed associated with execution of the code. A result of the execution of the quantum code can be output, at 710, to the communication device (e.g., via the transmitter/receiver component 116).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
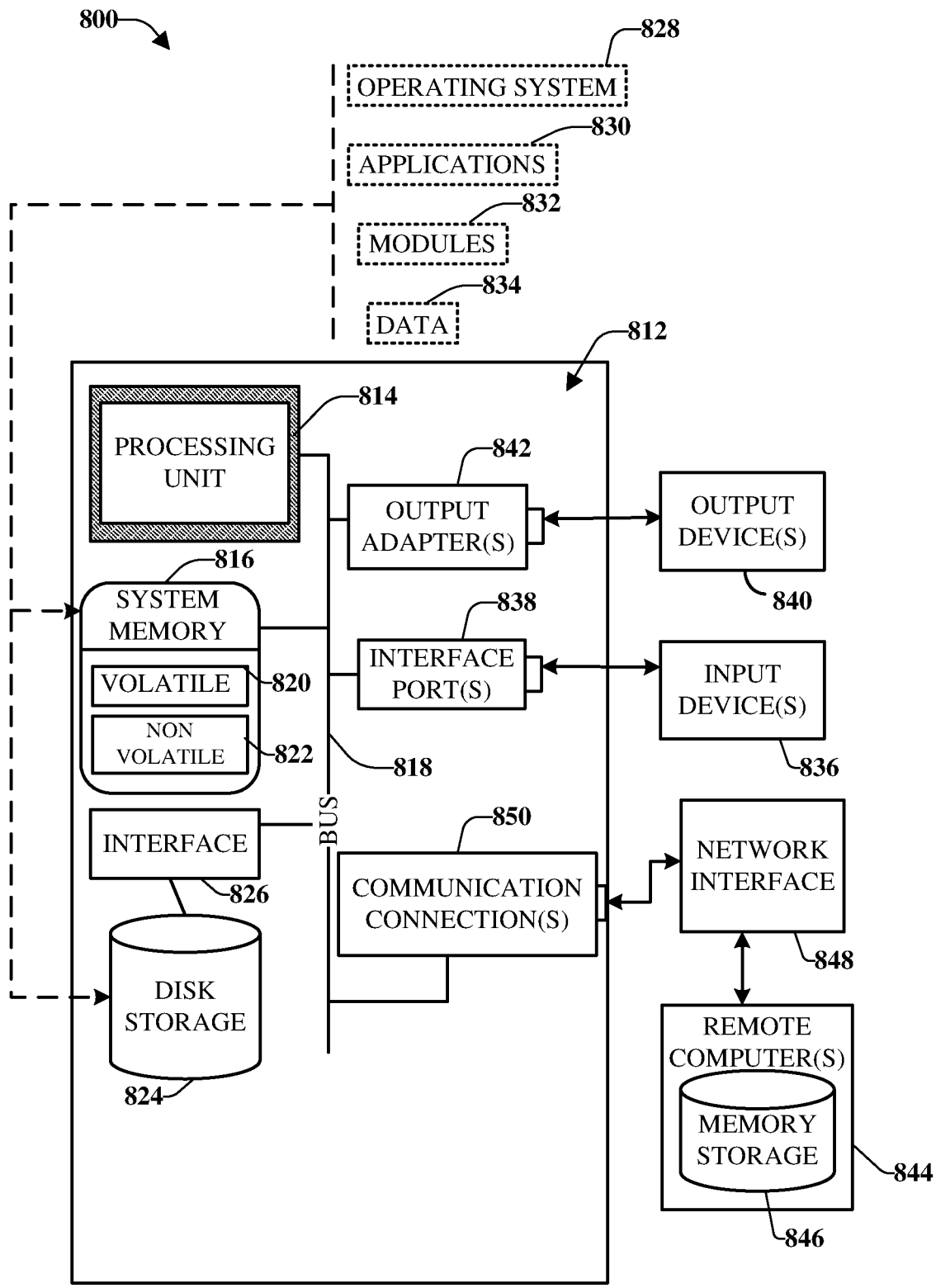
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity. With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/nonvolatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a method of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
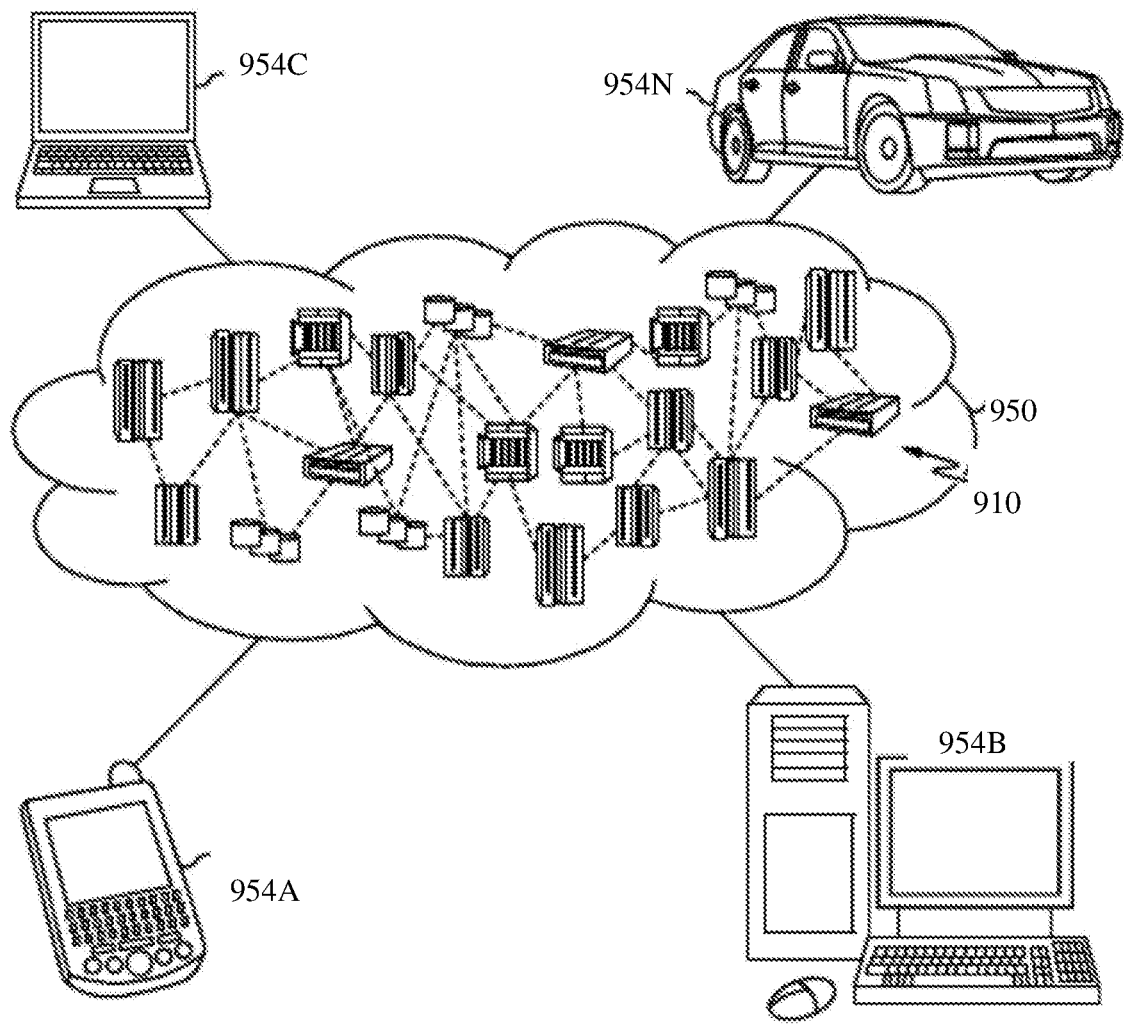
FIG. 9 depicts a cloud computing environment in accordance with one or more embodiments described herein.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
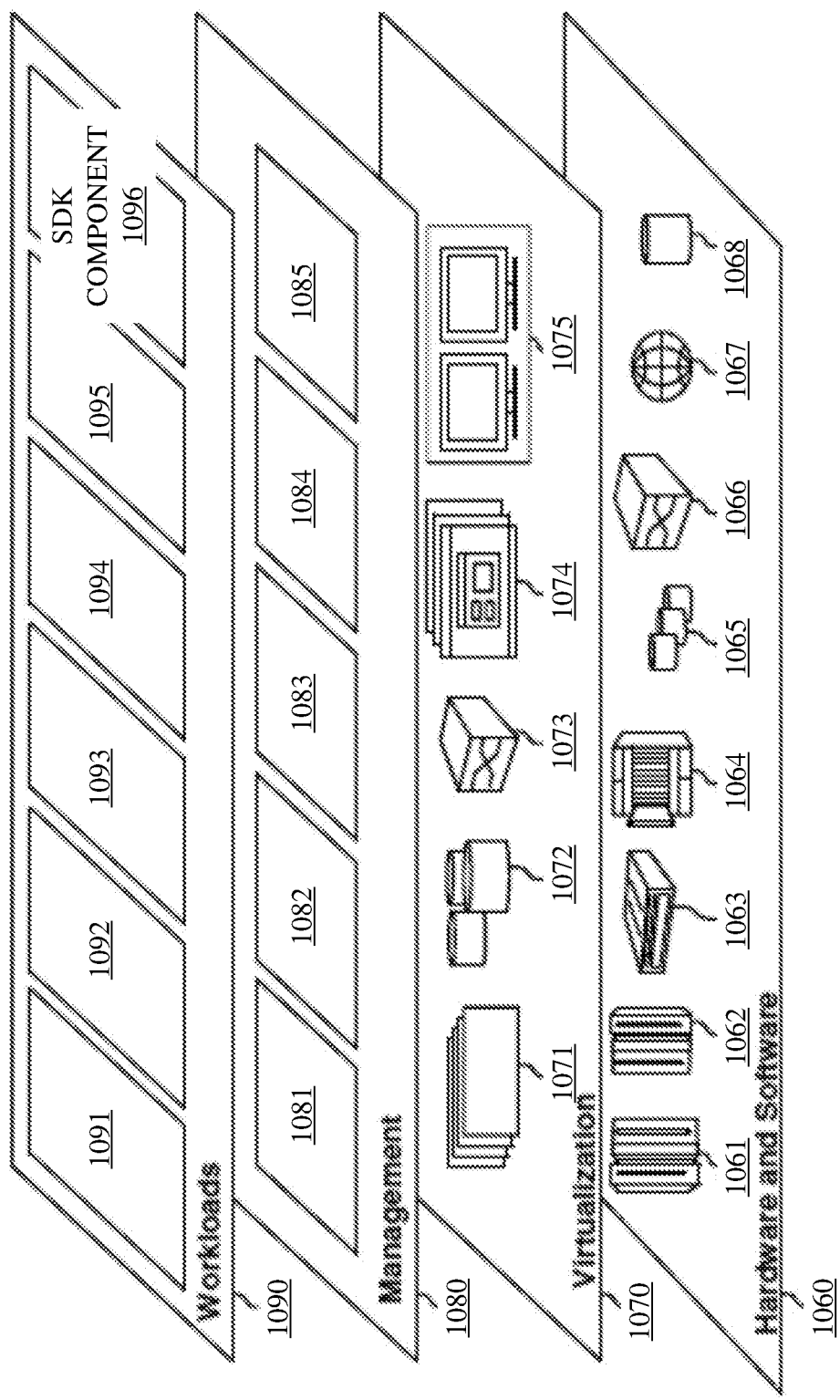
FIG. 10 depicts abstraction model layers in accordance with one or more embodiments described herein.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided: Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, the procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a Software Development Kit (SDK) component 1096.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        an execution component that executes, on a quantum device located within a cloud computing environment, an updated instance of software code executed on the quantum device based on an identification of the software code received from a communication device, wherein execution of the software code controls operation of the quantum device, wherein a quantum software development kit executes on the communication device to edit, remotely, the software code executed on the quantum device to generate the updated instance of software code, and, wherein the software code utilizes a portion of the software development kit; and
        a developer kit component that authenticates the communication device prior to updating the software code or an execution of one or more quantum computing functions, wherein the communication device can select a set of options and a set of configurations, and, wherein the communication device renders input data to a visual or an audio format.

2. The system of claim 1, wherein the computer executable components further comprise:
    an assessment component that grants the communication device access to the set of options and the set of configurations based on a profile associated with the communication device, wherein based on historical interaction between the communication device and the system, an assessment component grants access to a preferable configuration.

3. The system of claim 1, wherein the computer executable components further comprise:
    an identification component that selects the quantum device from a group of quantum devices and as a function of the software code received from the communication device.

4. The system of claim 1, wherein the computer executable components further comprise:
    a modification component that updates the software code at the quantum device to incorporate the updated instance of software code received from the communication device into a prior instance of software code executing on the quantum device, and, wherein the execution component executes, on the quantum device, an updated software code at the quantum device wherein the updated instance of software code is incorporated into the updated software code.

5. The system of claim 1, wherein the computer executable components further comprise:
    a communication component that outputs, to the communication device, a result of an execution of the software code, at the quantum device, by the execution component.

6. The system of claim 1, wherein the execution component facilitates usage of quantum characteristics for execution of the software code at the quantum device, wherein the quantum characteristics are not accessible by the communication device.

7. The system of claim 1, wherein execution of the software code on the quantum device by the execution component increases a processing speed associated with the execution of the software code.

8. A computer-implemented method, comprising:
    executing, by a system operatively coupled to a processor, an updated instance of software code at a quantum device of quantum devices, wherein an identification of the software code is received from a communication device, wherein the software code controls operation of the quantum device, wherein a quantum software development kit executes on the communication device to facilitate remote edit of the software code executed on the quantum device to generate the updated instance of software code, wherein the quantum device is located in a cloud computing environment, and wherein the software code is optimized based on a repository of optimizations and based on a plurality of profiles of respective available ones of the quantum devices; and
    authenticating, by a system operatively coupled to a processor, the communication device prior to updating the software code or an execution of one or more quantum computing functions, wherein the communication device can select a set of options and a set of configurations, and wherein the communication device renders input data to a visual or an audio format.

9. The computer-implemented method of claim 8, further comprising:
    granting, by the system, the communication device access to the set of options and the set of configurations based on a profile associated with the communication device, wherein based on historical interaction between the communication device and the system, granting access to a preferable configuration, and wherein the profile is one of the plurality of profiles.

10. The computer-implemented method of claim 8, further comprising:
    selecting, by the system, the quantum device from a group of the quantum devices and as a function of the software code received from the communication device.

11. The computer-implemented method of claim 8, further comprising:
    updating, by the system, the software code at the quantum device with the updated instance of the software code received from the communication device, resulting in an updated software code; and
    executing, by the system, the updated software code on the quantum device.

12. The computer-implemented method of claim 8, further comprising:
 outputting, by the system, a result of an execution of the software code to the communication device.

13. The computer-implemented method of claim 8, further comprising:
 utilizing, by the system, quantum characteristics for execution of the software code at the quantum device, wherein the quantum characteristics are not accessible by the communication device.

14. The computer-implemented method of claim 8, wherein the executing the software code at the quantum device comprises increasing, by the system, a processing speed associated with execution of the software code.

15. The computer-implemented method of claim 8, further comprising:
 metering, by the system, usage of a computing function of the quantum device associated with the software code; and
 generating, by the system, an invoice based on the usage of the computing function.

16. A computer program product that facilitates usage of a quantum software developer kit and framework as a service, the computer program product comprising a computer readable storage medium having program instructions embodied therewith, the program instructions are executable by a processor to cause the processor to:
 execute, on a quantum device located in a cloud computing environment, updated instance of software code executed on the quantum device based on an identification of the software code received from a communication device, wherein execution of the software controls operation of the quantum device, wherein a quantum software development kit executes on the communication device to facilitate remote edit of the software code executed on the quantum device to generate the updated instance of the software code, and wherein the software code is optimized based on a plurality of profiles of respective available ones of the quantum devices; and
 authenticate an entity and the communication device prior to an execution of one or more quantum computing functions, wherein the communication device can select a set of options and a set of configurations, and wherein the communication device renders input data to a visual or an audio format.

17. The computer program product of claim 16, wherein the program instructions further cause the processor to:
 grant the communication device access to the set of options and the set of configurations based on a profile associated with the communication device, wherein based on historical interaction between the communication device and the system, grant access to a preferable configuration, and wherein the profile is one of the plurality of profiles.

18. The computer program product of claim 16, wherein the program instructions further cause the processor to:
 select the quantum device from a group of quantum devices and as a function of the software code received from the communication device.

19. The computer program product of claim 16, wherein the program instructions further cause the processor to:
 update the software code at the quantum device to incorporate the updated instance of software code received from the communication device into a prior instance of software code executing on the quantum device, and
 executing the updated instance of software code on the quantum device.

20. The computer program product of claim 16, wherein the program instructions further cause the processor to:
 output, to the communication device, a result of an execution of the software code at the quantum device.

* * * * *